US010349775B2

(12) United States Patent
Lego et al.

(10) Patent No.: US 10,349,775 B2
(45) Date of Patent: Jul. 16, 2019

(54) OPERATION OF A VAPORIZER OF A DOMESTIC APPLIANCE

(71) Applicant: BSH Hausgeräte GmbH, Munich (DE)

(72) Inventors: Dieter Lego, Karlsruhe (DE); Martin Nagel, Forstheim (DE); Benjamin Wagner, Bretten (DE)

(73) Assignee: BSH Hausgeräte GmbH, Munich (DE)

(*) Notice: Subject to any disclaimer, the term of this patent is extended or adjusted under 35 U.S.C. 154(b) by 348 days.

(21) Appl. No.: 15/126,607

(22) PCT Filed: Mar. 19, 2015

(86) PCT No.: PCT/EP2015/055841
§ 371 (c)(1),
(2) Date: Sep. 16, 2016

(87) PCT Pub. No.: WO2015/150101
PCT Pub. Date: Oct. 8, 2015

(65) Prior Publication Data
US 2017/0079470 A1 Mar. 23, 2017

(30) Foreign Application Priority Data
Apr. 2, 2014 (DE) .................. 10 2014 206 281

(51) Int. Cl.
A21B 3/04 (2006.01)
F22B 1/28 (2006.01)
(Continued)

(52) U.S. Cl.
CPC .............. A47J 36/00 (2013.01); A21B 3/04 (2013.01); A47J 27/004 (2013.01); F22B 1/28 (2013.01);
(Continued)

(58) Field of Classification Search
CPC ....... A47J 36/00; A47J 27/004; H05B 1/0244; H05B 2203/021
(Continued)

(56) References Cited

U.S. PATENT DOCUMENTS 4,426,923 A * 1/1984 Ohata .................. A47J 39/003
126/20
5,168,714 A 12/1992 Karlheinz Faerber et al.
(Continued)

FOREIGN PATENT DOCUMENTS

CN 201885202 U 6/2011
DE 3201574 A1 7/1983
(Continued)

OTHER PUBLICATIONS

National Search Report DE 10 2014 206 281.0 dated Jun. 10, 2015.
(Continued)

Primary Examiner — Thien S Tran
(74) Attorney, Agent, or Firm — Michael E. Tschupp; Andre Pallapies; Brandon G. Braun

(57) ABSTRACT

In a method for operating a vaporizer of a domestic appliance, the vaporizer is filled at least to a predetermined filling level. The vaporizer can be emptied using an emptying arrangement. A time measurement is started, when a filling level falls below the predetermined filling level. A heating system of the vaporizer is switched on, when the filling level falls below the predetermined filling level. The time measurement is stopped, when the heating system has overheated, and a delivery output is calculated during emptying of the vaporizer, from a duration for emptying that is determined by the time measurement.

14 Claims, 5 Drawing Sheets

(51) Int. Cl.
  *H05B 1/02* (2006.01)
  *A47J 27/00* (2006.01)
  *A47J 36/00* (2006.01)
  *F22B 37/50* (2006.01)
  *F24C 15/32* (2006.01)

(52) U.S. Cl.
  CPC ............ *F22B 37/50* (2013.01); *F24C 15/327* (2013.01); *H05B 1/0244* (2013.01); *H05B 2203/021* (2013.01)

(58) Field of Classification Search
  USPC .................... 99/282, 330, 468, 474; 426/520
  See application file for complete search history.

(56) References Cited

U.S. PATENT DOCUMENTS

| | | | | |
|---|---|---|---|---|
| 5,363,471 | A | * | 11/1994 | Jones .................. F22B 1/30 219/483 |
| 2007/0114222 | A1 | | 5/2007 | Shon et al. |
| 2008/0163757 | A1 | | 7/2008 | Jeon et al. |
| 2009/0007797 | A1 | * | 1/2009 | Ando ...................... A21B 3/04 99/330 |
| 2009/0038481 | A1 | * | 2/2009 | Yamamoto ............... A21B 3/04 99/330 |
| 2014/0060339 | A1 | * | 3/2014 | Jeon ...................... F24C 15/327 99/330 |

FOREIGN PATENT DOCUMENTS

| | | |
|---|---|---|
| DE | 19741881 A1 | 3/1999 |
| EP | 1658798 A1 | 5/2006 |
| EP | 2461107 A1 | 6/2012 |
| EP | 2298140 B1 | 7/2013 |
| EP | 1870641 B1 | 12/2013 |
| EP | 2366315 B1 | 3/2016 |
| JP | 2005241190 A | 9/2005 |
| WO | 2009007456 A2 | 1/2009 |
| WO | 2011147798 A1 | 12/2011 |

OTHER PUBLICATIONS

International Search Report PCT/EP2015/055841 dated Aug. 27, 2015.
National Search Report CN 201580017670.7 dated Mar. 19, 2018.

* cited by examiner

OPERATION OF A VAPORIZER OF A DOMESTIC APPLIANCE

CROSS-REFERENCES TO RELATED APPLICATIONS

This application is the U.S. National Stage of International Application No. PCT/EP2015/055841, filed Mar. 19, 2015, which designated the United States and has been published as International Publication No. WO 2015/150101 and which claims the priority of German Patent Application, Ser. No. 10 2014 206 281.0 filed Apr. 2, 2014, pursuant to 35 U.S.C. 119(a)-(d).

BACKGROUND OF THE INVENTION

The invention relates to a method for operating a vaporizer of a domestic appliance, the vaporizer being provided with a heating system and having at least part of a level detector for detecting a predetermined filling level and at least part of an overheating detector for establishing that the heating system has overheated. The invention further relates to a vapor processing appliance that is set up to perform the method. The invention is particularly advantageously applicable to steam cooker appliances, either as individual appliances or combination appliances.

Vaporizers for domestic appliances that are filled and emptied in time-controlled manner using pumps are known. Since the throughput rate of pumps generally fluctuates, if emptying is controlled purely by time the pump may briefly run dry. This in turn has a negative effect on the service life of the pump, and is associated with high levels of noise emission.

DE 10 2006 029 578 A1 discloses a steam cooker as a vaporizer arrangement having a vaporizer for water, wherein the vaporizer has a heatable water container and an identification region, which is attached to the water container in the manner of communicating tubes, for identifying the filling level of the water container. The identification region is in upright tubular form and has at least one sensor for detecting the filling level.

DE 10 2009 044 053 A1 discloses a steam generator for a domestic appliance, having a vaporizing chamber to which a connector for feeding in water and at least one connector for removing vapor are attached such that they conduct flow, and having a heatable vaporizer surface that is arranged at an angle to the horizontal in the installed position and above which a vaporizing chamber for the generated vapor is formed, in which a flow of vapor in the direction of the vapor outlet is formed, wherein the water intake to the vaporizer surface can be controlled or regulated by way of a pump or a valve that is arranged in the infeed line and the water level above the vaporizer surface is detected by means of a level monitoring arrangement and is evaluated for control of the water supply to the vaporizer surface. In order to construct a steam generator for a domestic appliance that has a small overall volume and high heat output and vapor output and is constructed for continuous steam generation and in which the possibility that the heating arrangement will run dry is reliably avoided, the level monitoring arrangement is arranged in the region of the vaporizing chamber of the steam generator in which there is formed only a low intensity of flow, or none at all, of the steam over the vaporizer surface.

DE 10 2010 029 307 A1 discloses a domestic appliance having a container for receiving liquids, which is set up in particular for storing a detergent and for automatically dispensing said detergent. An electrical measuring arrangement that measures a filling level of the storage container is provided. The measuring arrangement has two measuring electrodes, which are arranged spaced from one another in the container, and a circuit arrangement, which is coupled to the measuring electrodes and is constructed to apply an alternating voltage between the measuring electrodes and to measure at least one measuring variable that is correlated to the alternating voltage and to a conduction value of a medium that is located between the measuring electrodes. Also disclosed is a corresponding level measuring method.

WO 2009/007456 A2 discloses a device for adding water to the steam generation in a cooker appliance, having a vaporizer vessel, to which water may be supplied as a function of the filling level of water in the vaporizer vessel, and electrodes, by means of which the filling level of the water in the vaporizer vessel may be detected, wherein an inner wall of the vaporizer vessel takes the form, at least in part, of an electrically conductive material and this part of the inner wall is a first electrode.

EP 0 471 342 A2 discloses an arrangement in which two measuring electrodes are arranged in a container at different horizontal and vertical distances from an electrically conductive, grounded inner wall of the container, one of them in the region of the ice layer that forms. The measuring electrodes pick up resistance values of the ice and/or the water that is located between the electrodes and the container inner wall. For cooling the water, regardless of its chemical/physical composition, potentials that correspond to the resistance values are formed and are supplied to a difference amplifier. Depending on a comparison of the size of the two resistance values, a refrigerator unit that acts on the content of the container is switched on or off.

DE 10 2009 055 146 A1 discloses a vapor generation system for a domestic appliance, in particular a steam cooker appliance, which has at least one emptiable liquid reservoir, a vaporizer that may be supplied with liquid from the liquid reservoir by way of at least one supply line, and at least one pump for moving the liquid, wherein the liquid may be fed back in the direction of the liquid reservoir by means of the at least one pump. A method serves for operation of the vapor generation system.

DE 19741881 A1 discloses a domestic appliance for steam cooking at close to ambient pressure, which has a cooking chamber, a vapor generator with a heating arrangement, and a temperature sensor that is connected to a regulating arrangement for regulating the heating arrangement of the vapor generator. In order to provide a domestic appliance for steam cooking at close to ambient pressure in which exclusively vapor is used for cooking, and which is to be capable of installation in the kitchen flexibly and independently of conditions at the installation site, the vapor generator is arranged with the heating arrangement separate and outside the cooking chamber. Preferably, a water container is arranged in the area surrounding the vapor generator, and the temperature sensor is arranged in the cooking chamber.

BRIEF SUMMARY OF THE INVENTION

It is the object of the present invention at least partly to overcome the disadvantages of the prior art and in particular to provide a way of preventing a pump of a vaporizer of a domestic appliance from running dry.

This object is achieved in accordance with the features of the independent claims. Preferred embodiments may be found in particular in the dependent claims.

The object is achieved by a method for operating a vaporizer of a domestic appliance, the vaporizer being provided with a heating system and having at least part of a level detector for detecting a predetermined filling level and at least part of an overheating detector for establishing that the heating system has overheated. The method has at least the following steps: (i) filling the vaporizer at least to the predetermined filling level; (ii) emptying the vaporizer by means of an emptying arrangement; (iii) starting a time measurement once the level falls below the predetermined filling level; (iv) switching on a heating system of the vaporizer once the level falls below the predetermined filling level; (v) stopping the time measurement once it has been established that the heating system has overheated; and (vi) calculating a delivery output during emptying of the vaporizer, from a duration for emptying that is determined by means of the time measurement.

This object has the advantage that it can prevent an emptying arrangement that is for emptying the vaporizer from running dry, without additional sensor systems (e.g. pressure or throughput meter) and hence simply and inexpensively. As a result, in turn, the service life of an emptying arrangement may be extended, and it is possible to avoid offending noise from the emptying arrangement during dry running in normal operation. This method also enables the use of a particularly cost-effective emptying arrangement with higher tolerances in respect of its delivery output.

The predetermined filling level may be one filling level of a plurality of detectable filling levels or filling values. As an alternative, the predetermined filling level may be the only detectable filling level. In particular, the predetermined filling level may be an upper detectable, "upper" or "maximum" filling level.

As a result of step (i), the receiving chamber is filled at least to its, in normal operation, predetermined or maximum level. Identification of whether the predetermined filling level has been reached is performed by the level detector.

Then, in step (ii), the emptying arrangement for emptying the vaporizer or its receiving chamber is set in operation.

If, in step (iii), the level detector identifies that the liquid in the receiving chamber has fallen below the predetermined filling level, the time measurement is triggered, for example at a starting time $t0$. The starting time $t0$ thus corresponds to the time at which the level has just fallen below the predetermined filling level. Since, at this point in time, the deviation from the predetermined filling level is very small, the starting time $t0$ corresponds to the predetermined filling level with a high degree of accuracy.

Switching on the heating system in step (iv) ensures that the heating system is at operating temperature or at least close to operating temperature when the emptying arrangement has emptied the vaporizer or its receiving chamber (possibly apart from small puddles of liquid on the base of the receiving chamber). However, when the vaporizer or its receiving chamber is emptied, the heating system overheats, a fact that is established by the overheating detector. Since the overheating detector typically responds quickly, the end time $t1$ at which overheating of the heating system is established corresponds with sufficient accuracy to the point in time at which the vaporizer or its receiving chamber has been emptied.

In step (v), at the end time $t1$, time measurement is stopped. Consequently, an emptying duration $\Delta te$ is produced from a difference $t1-t0$. This emptying duration $\Delta te$ takes into account a plurality of boundary parameters that can otherwise only be predetermined with difficulty, and that affect the throughput of the emptying arrangement. By utilizing this emptying duration $\Delta te$, it is thus possible to detect and take into account the tolerances that are inherent in the system. In the case of an emptying arrangement in the form of or having a pump, the emptying duration $\Delta te$ may also be designated the "pump-out time".

In step (vi), a delivery output during emptying of the vaporizer or its receiving chamber is determined from the emptying duration, or the duration for emptying, $\Delta te$. As a result of the delivery output during emptying, which in this way is determined comparatively accurately, it is possible to avoid dry running of the emptying arrangement, in particular a pump, even when the emptying arrangement is in that case operated in time-controlled manner.

A development provides for the vapor processing appliance to be an appliance for processing food, in particular a cooking appliance. The vapor processing appliance may be an independent appliance or may be a combination appliance, in particular having an oven with steam cooking functionality. An oven of this kind may be an individual appliance or a combination oven/hob (cooker). The oven may in particular be a baking oven.

A development provides for the vapor processing appliance to be a domestic appliance, for example of the "white goods" type.

The vaporizer serves to evaporate or to convert to vapor liquid therein, by means of the heating system. In particular, the heating system is an electrically operated heating system. The vapor that is generated may be fed into a food processing chamber of the vapor processing appliance. In order to receive the liquid that is heatable by the heating system, the vaporizer has a receiving chamber. The heating system is preferably arranged in the receiving chamber and/or on a wall of the receiving chamber. The liquid may in particular be water with or without additives, in particular tap water. The vaporizer may also be designated a vaporizing unit or a vapor generation arrangement.

The vaporizer may be accommodated in the food processing chamber, for example on the wall or on the base, or may be accommodated outside the food processing chamber.

The level detector may for example have a float that is accommodated to be movable in the receiving chamber or in a measuring chamber that is in fluidic connection therewith. The float may be triggered for example mechanically or magnetically, for example by means of the Hall effect. The level detector may, in addition or as an alternative, take the form of an electrical switch. The electrical switch may have for example two electrodes that are electrically connectable by the liquid when the liquid reaches the predetermined filling level. The level detector may also have visual or capacitive arrangements and/or arrangements for detecting that the predetermined filling level has been reached or exceeded.

The emptying arrangement may in particular be or have a pump. The method is particularly suitable for protecting a piston pump from damage as a result of preventing frequent dry running.

The term "part of a detector" may in particular be understood to mean a sensor part or a sensor of the detector, for example electrical contacts, a Hall-effect sensor, an IR sensor system, a film that is electrically conductive as a function of heat, etc. An evaluation unit for evaluation (for example for performing a threshold value comparison) of a signal that is emitted by the sensor system (for example analog or digital measured values, such as voltage values) may represent part of the vaporizer or may be arranged for example outside the vaporizer. The evaluation unit may comprise for example a circuit such as a microprocessor, an ASIC, an FPGA, etc. However, it is also possible to dispense with an evaluation unit. Thus, for example, a switch, for example an electronic switch such as a transistor or an electrical switch such as a relay, may be triggered by a voltage signal that is emitted by a sensor system.

One embodiment provides for step (i) to comprise filling the vaporizer beyond the predetermined filling level. This ensures that the transition between "vaporizer full" (predetermined, in particular upper, filling level reached) and "vaporizer no longer full" (level falls below predetermined filling level) may be established in a particularly reliable manner and the possibility of for example hysteresis effects caused by liquid adhesion, etc. is eliminated. To prevent liquid from coming out of a vapor outlet opening in the vaporizer during this, the predetermined filling level is preferably spaced below a lower edge of the vapor outlet opening. Step (i) may for example comprise filling the vaporizer for a predetermined duration after it has been established that the predetermined filling level has been reached.

Another embodiment provides for step (iv) to comprise switching on the heating system directly once the level falls below the predetermined filling level. This ensures in particularly reliable manner that the heating system has been heated to normal high temperature once the vaporizer or its receiving chamber has been emptied. In this case, a volume reduction in the liquid in the vaporizer as a result of the development of vapor is typically negligibly small.

A further embodiment provides for step (iv) to comprise switching on the heating system with a defined delay once it has been established that the level has fallen below the predetermined filling level. As a result, a heating system that is sufficiently heated for the purpose of performing the method once the vaporizer has been emptied can still be provided, but in this case with less power consumption.

Yet a further embodiment provides for establishing the fact of overheating of the heating system in step (v) to trigger switching off of the heating system. Consequently, the establishment of overheating may represent part of a safety switch-off routine in order to protect the vaporizer from being damaged or even destroyed.

Another embodiment provides for calculating the delivery output Le during emptying in step (vi) to comprise dividing a liquid volume Ve of the vaporizer or its receiving chamber by the emptying duration $\Delta te$, that is to say in particular:

$$Le = Ve/\Delta te \quad (1)$$

A development provides for $$Le = [(Ve+A)/(\Delta te+B)] + C \quad (2)$$

where A, B, and C are particular numerical values that are determined in particular by calculation and/or experiment, in particular so-called "offsets". Each of the numerical values may be negative, positive or zero. As a result of these numerical values, a correction, determined in particular by experiment, of the parameter to which it is added may be performed. Thus, a correction of the duration required for emptying may be performed by the numerical value B, for example of the magnitude of a time offset between emptying the receiving chamber and overheating of the heating system.

Further, one embodiment provides for the following further steps to follow step (vi): (a) filling the vaporizer at least to the predetermined filling level; (b) establishing a duration for filling to the predetermined filling level; and (c) calculating a delivery output during filling by means of dividing a liquid volume of the vaporizer by the duration for filling.

This embodiment may in particular be used as a safety feature of the vapor processing appliance. It utilizes the fact that after step (vi) the receiving chamber of the vaporizer no longer contains any liquid. Residues and puddles have typically been evaporated by the heating system. Thus, a particularly accurate determination of the delivery output during filling is possible.

One embodiment provides for filling to be stopped, in particular in a vapor processing operation of the vaporizer, if a safety threshold value that is determined on the basis of the delivery output during filling is reached or exceeded. For example, filling may be switched off once a predetermined time threshold is passed. This allows filling of the vaporizer to be interrupted if the level detector fails. This in turn prevents the vapor processing appliance from overflowing and may also prevent water damage outside the appliance.

Moreover, one embodiment provides for the method to be performed only in an abnormal operation of the vapor processing appliance that does not serve for the vapor processing of food. This abnormal operation may be performed on first start-up of the vapor processing appliance, after a power recovery, following certain maintenance programs, as part of a descaling program and/or in the context of a function test of the emptying arrangement.

The object is also achieved by a vapor processing appliance that is constructed for performing the above-mentioned method. The vapor processing appliance may be constructed in a manner analogous to the method and has the same advantages.

The vapor processing appliance has in particular a vaporizer that is provided with a heating system, as described above, wherein the vaporizer thus has at least one level detector for detecting a predetermined filling level and an overheating detector for establishing that the heating system has overheated. Moreover, the vapor processing appliance has for example a filling arrangement for filling the vaporizer (e.g. in accordance with method step (i)), an emptying arrangement for emptying the vaporizer (e.g. in accordance with method step (ii)), a time measuring arrangement for performing method steps (iii) and (v), and/or a calculating arrangement at least for performing step (vi).

The time measuring arrangement may in particular be a timer that is provided in the vapor processing appliance.

The calculating arrangement may be an independent calculating arrangement. It is advantageous for a simple and inexpensive construction if, as the calculating arrangement, an arrangement that is conventionally already provided in the vapor processing appliance may be utilized, for example a central control system. The calculating arrangement may in particular take the form of an electronic circuit, for example having a microprocessor, an ASIC, an FPGA, etc.

One embodiment provides for the heating system to be a surface heating system that is arranged on the base of a receiving chamber for liquid. This gives the advantage that utilization of the whole of the liquid in the receiving chamber for generating vapor is made possible in a simple manner. Moreover, in this way, once the receiving chamber has been emptied, any residual liquid that is present on the base can be evaporated. The surface heating system preferably covers virtually the entire surface of the base.

The reservoir chamber is filled with and emptied of liquid, in particular water. It is preferably filled with tap water, while the emptied liquid may for example be regarded as wastewater.

A further embodiment provides for the heating system to serve as an overheating detector. For example, the heating system, in particular a surface heating system, may have a film that is electrically conductive as a function of temperature. In that case, a temperature of the surface heating system and consequently overheating may be determined by establishing the fact that there is conductivity, or a corresponding electrical variable, for example by comparison with a predetermined threshold value.

As an alternative, an overheating detector that is made separately from the heating system may be used. This overheating detector may for example be pressed against, welded to or soldered to the heating system, for example being a thermocouple. It may also be arranged at a distance from the heating system, for example being an IR sensor.

A development provides for the filling arrangement and the emptying arrangement to be different functional units. As a result, the delivery properties may be adapted to the respective purpose particularly precisely. Thus, another embodiment provides for the filling arrangement and the emptying arrangement each to have or be pumps.

A development provides for the filling arrangement and the emptying arrangement to be fluidically separated from one another and for this purpose in particular to be attached to fluid infeed lines that are fluidically separated from one another. In this way, it is possible for example to separate a tap water region from a wastewater region.

As an alternative, a filling arrangement and an emptying arrangement may take the form of a single combined filling and emptying arrangement, for example having or in the form of a single pump. The filling and emptying may in that case be achieved by the appropriate positioning of one or more valves of an, at least in certain sections, cohesive line system for the liquid.

BRIEF DESCRIPTION OF THE DRAWINGS

The properties, features and advantages of this invention that have been described above, and the way in which they are achieved, will become clearer and more readily understood in conjunction with the schematic description below of an exemplary embodiment that is explained in more detail in conjunction with the drawings.

DETAILED DESCRIPTION OF EXEMPLARY EMBODIMENTS OF THE PRESENT INVENTION

Figure 1:
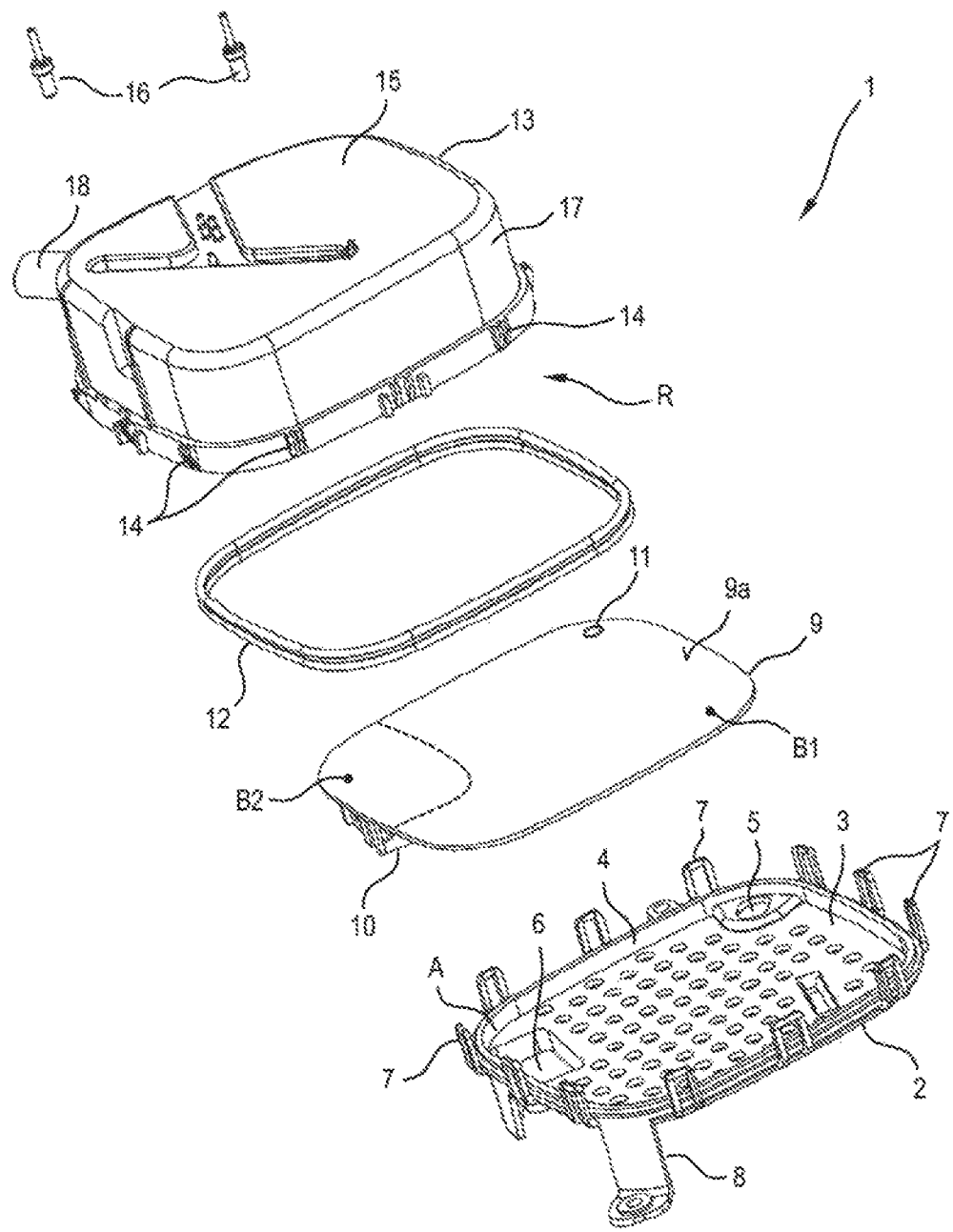
FIG. 1 shows, as an exploded illustration in perspective view, a vaporizer that is suitable for performing the method according to the invention.

FIG. 1 shows, as an exploded illustration in perspective view, a vaporizer 1 that is provided for example for use in a domestic appliance H (see FIG. 2), for example in an independent steam cooker or a baking oven with steam cooker function.

The vaporizer 1 has a base part 2 with a region 3 in the base and, attached thereto, a peripheral rim 4 that projects toward the front. The region 3 in the base has in this case, by way of example, a planar basic shape with a rectangular outer contour A having rounded edges. In the region 3 in the base there are at least two openings, in this case comprising a water passage opening 5 and a leadthrough opening 6 for leading through an electrical connector. A plurality of resilient latching tabs 7 extends upward from the rim 4. Moreover, at least one securing tab 8 protrudes toward the rear, for example for screwing to the domestic steam cooking appliance H.

The region 3 in the base is covered, sealingly and over the entire inside surface, by an electrically operated surface heating system 9. On its rear side, the surface heating system 9 has an electrical connector 10 that projects through the leadthrough opening 6. Further, the surface heating system 9 has a hole 11 that is congruent with the water passage opening 5. Water can be introduced and drained away through the hole 11 and the water passage opening 5.

The surface heating system 9 may be heated over its surface and for this purpose may for example have an electrically conductive surface 9a facing the liquid. Moreover, it has a film (for example internally) that, when a predetermined threshold temperature is exceeded, becomes electrically conductive. Thus, a pronounced change in the electrical conductivity or the electrical resistance or a current that may be conducted through this film indicates that the threshold temperature has been reached and thus also that overheating has started. The threshold temperature may be for example around 200° C. The surface heating system 9 thus at the same time serves as an overheating detector for establishing that it has overheated.

Optionally, the surface heating system 9 has at least one heatable or heated partial region or at least one heated zone B1 and at least one unheated partial region or at least one unheated zone B2. While for example at least one heat conductor is laid to the heated zone B1 (for example in the shape of a coil), it is not present in the unheated zone B2. In the switched-on condition, the heated zone B1 is at a temperature above a predetermined temperature T, while in the switched-on condition the unheated zone B2 is at a temperature below the predetermined temperature T. In particular, this may greatly agitate or even boil the water in the heated zone B 1, while the water, or its free surface, remains comparatively still in the unheated zone B2. The unheated zone B2 in this case occupies at least a corner region of the surface heating system 9.

Placed together, the surface heating system 9 and the cover 13 form a receiving chamber R for water. The surface heating system 9 in this case forms the base of the receiving chamber R.

Seated on the rim 4 over a peripheral seal 12 is a domed or dish-like cover 13. The seal 12 may be drawn, for example at the rim, onto the surface heating system 9 and seal it off from the region 3 in the base and the cover 13. The cover 13 has on the outside a plurality of latching lugs 14 that are provided for engagement with the latching tabs 7 and enable a simple latching connection between the base part 2 and the cover 13. The cover 13 has, in its opposite upper wall 15 to the base part 2 and spaced therefrom, two holes (not illustrated) for leading through electrically conductive contact pins 16, in particular metal pins. The contact pins 16 are left free in the receiving chamber R.

Figure 2:
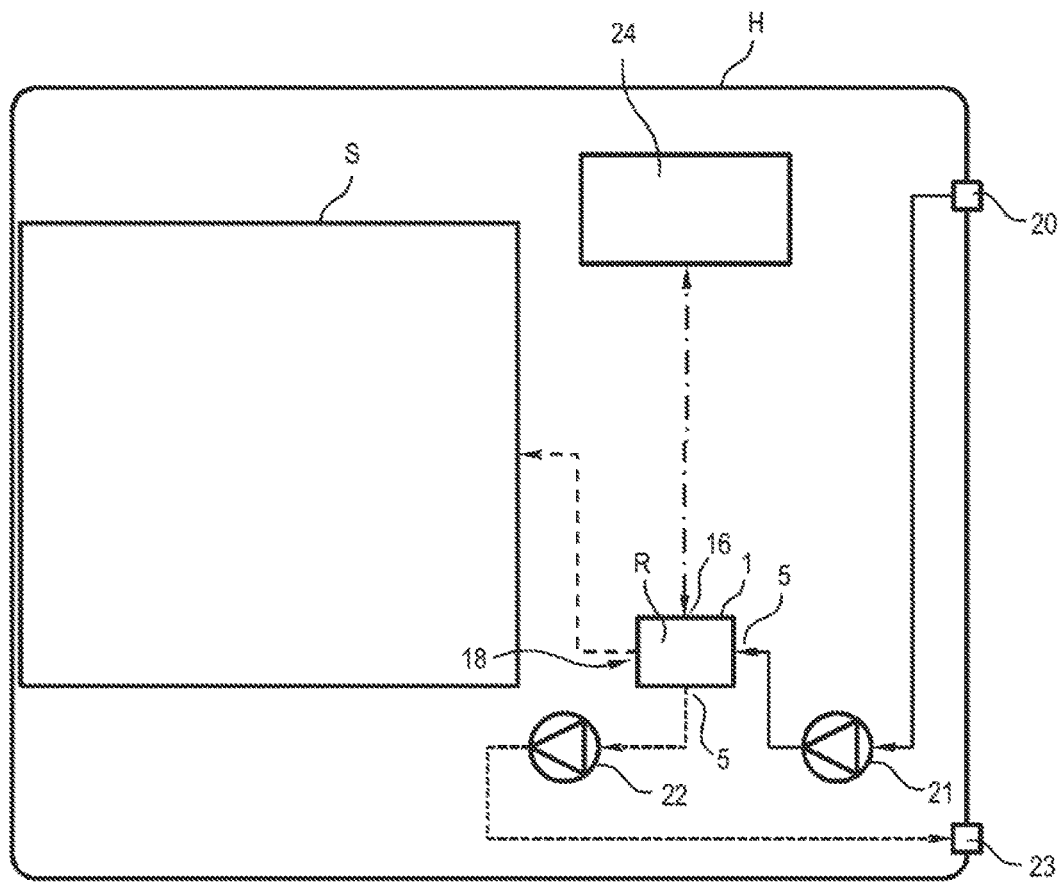
FIG. 2 shows, as a sectional illustration in side view, a vapor processing appliance having the vaporizer from FIG. 1.
Figure 3:
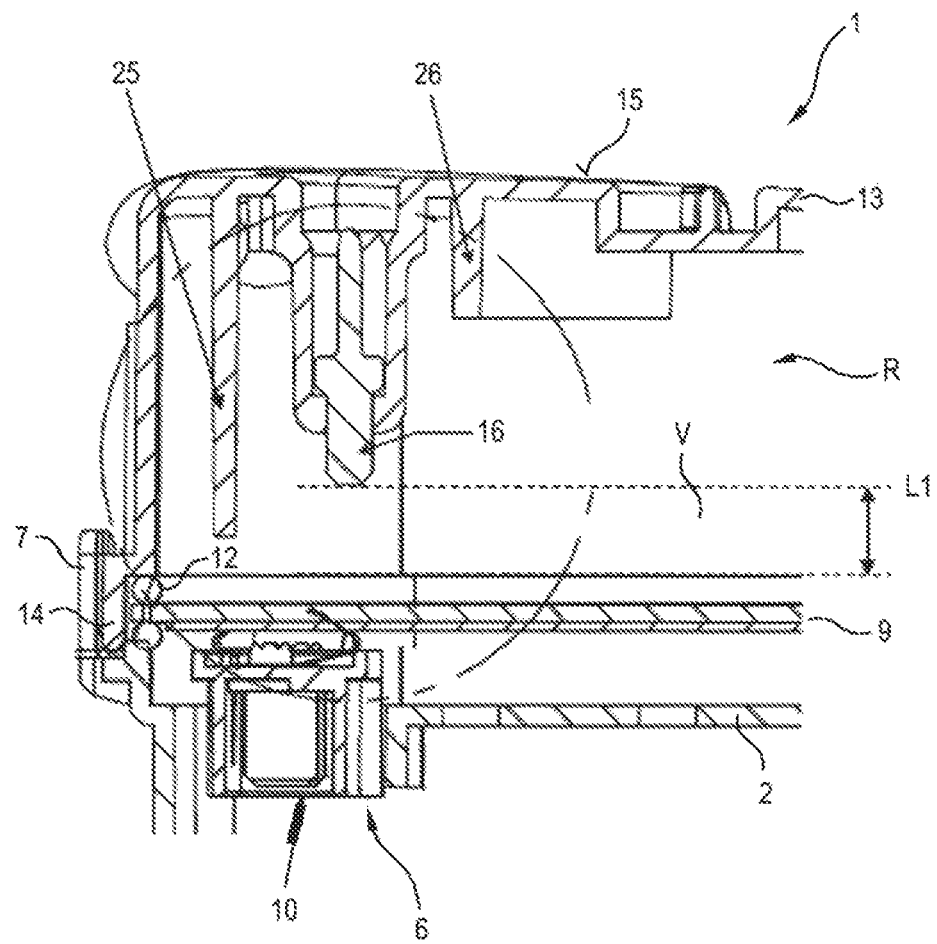
FIG. 3 shows, as a sectional illustration in side view, a detail of the assembled vaporizer.

The two contact pins 16 end in particular at the same height on the underside and are electrically connected to one another by water in the receiving chamber R or 2, 13 once the water reaches a predetermined (in particular "upper") filling level L1 (see also FIG. 3). The fact that this electrical short circuit has been established can be used to determine the predetermined filling level L1, for example by a control system 24 (see also FIG. 2). The control system 24 may apply a low alternating voltage to the contact pins 16 in order to eliminate electrolytic effects.

Once the predetermined filling level L1 has been reached, the vaporizer 1 is filled with a volume V of water.

The contact pins 16 lie above the unheated zone B2 of the surface heating system 9 in order to enable more reliable determining of a predetermined upper filling level L1, in particular little influenced by agitation of the water surface.

A vapor outlet 18 is located on a peripheral side wall 17 of the cover 13, close to the upper wall 15. The vapor outlet 18, which in this case takes the form for example of a pipe socket, may be attached for example to a hose for guiding the vapor that is generated by the vaporizer in the food processing chamber S of the domestic steam cooking appliance H. The vapor outlet 18 is arranged above the unheated zone B2, so that no small drops of water that are produced by agitated water in the heated zone B1 are carried along by the stream of vapor. This improves the quality of the vapor. The fewer water droplets there are in the stream of vapor, the higher its energy content and thus the efficiency. Furthermore, the material for cooking, or food, in the food processing chamber S is prevented from being damaged by the water droplets.

FIG. 2 shows, as a sectional illustration in side view, a domestic steam cooking appliance H that has the vaporizer from FIG. 1. The domestic steam cooking appliance H has a tap water connector 20 that is connected, by way of a filling pump 21 that serves as the filling arrangement, to the water passage opening 5 of the vaporizer 1. Further, the vaporizer 1 is connected through its water passage opening 5, by way of a drainage pump 22 that serves as the emptying arrangement, to a wastewater connector 23 of the vaporizer 1. Operation of the filling pump 21 and the drainage pump 22 is controlled by way of a control system 24. The control system 24 is also connected to the contact pins 16 and may establish that there is a short circuit across the contact pins 16.

The control system 24 may be for example a central control system of the domestic steam cooking appliance H, which may for example also control further functions such as operation of the surface heating system 9 of the vaporizer 1 and/or at least one heating arrangement (not illustrated) for heating a food processing chamber S.

The water passage opening 5 is illustrated here as taking the form of two spatially separated openings, a water inlet opening and a water outlet opening, but may be a joint water passage opening (that is to say a combined water inlet and water outlet opening), as in FIG. 1.

During operation of the vaporizer 1 for the vapor processing of food, vapor is introduced into the where appropriate heated-up food processing chamber S of the domestic steam cooking appliance H, by way of the vapor outlet 18 of the vaporizer 1. For this purpose, first water is pumped into the receiving chamber R by means of the filling pump 21 until a short circuit between the contact pins 16 establishes that the predetermined filling level L1 that is shown in FIG. 3 has been reached. Once the fact of the short circuit, and hence of the predetermined filling level, has been established, the filling pump 21 is stopped immediately or after a defined delay (e.g. between 1 second and 3 seconds). The surface heating system 9 that is then activated allows the water to vaporize, with the result that the water level falls. When the water level falls below the filling level L1, the short circuit created by the water is removed again and the control system 24 activates the filling pump 21 again for filling the receiving chamber R with water, and so on. Typically in this context, the filling pump 21 is activated twice to three times a minute, for five to seven seconds each time. The construction of the vaporizer 1 enables the water that is introduced to be vaporized particularly rapidly and without delay, for example as a result of the introduction of energy over a large surface area by means of the surface heating system 9, and as a result of a small predetermined filling level L1 in the millimeter range, for example between eight and ten millimeters, preferably 9 mm.

As is further shown in FIG. 3, partition walls 25 and 26 project internally into the receiving chamber R from the upper wall 15 of the cover 13. At least one of the partition walls 25 and 26 crosses a region between the two contact pins 16 and hence lengthens a path between the contact pins 16. This lengthens an electrical creepage distance between the two contact pins 16, which may be formed as a result of a fine coating of water-absorbing lime scale on the inside of the cover 13.

Figure 4:
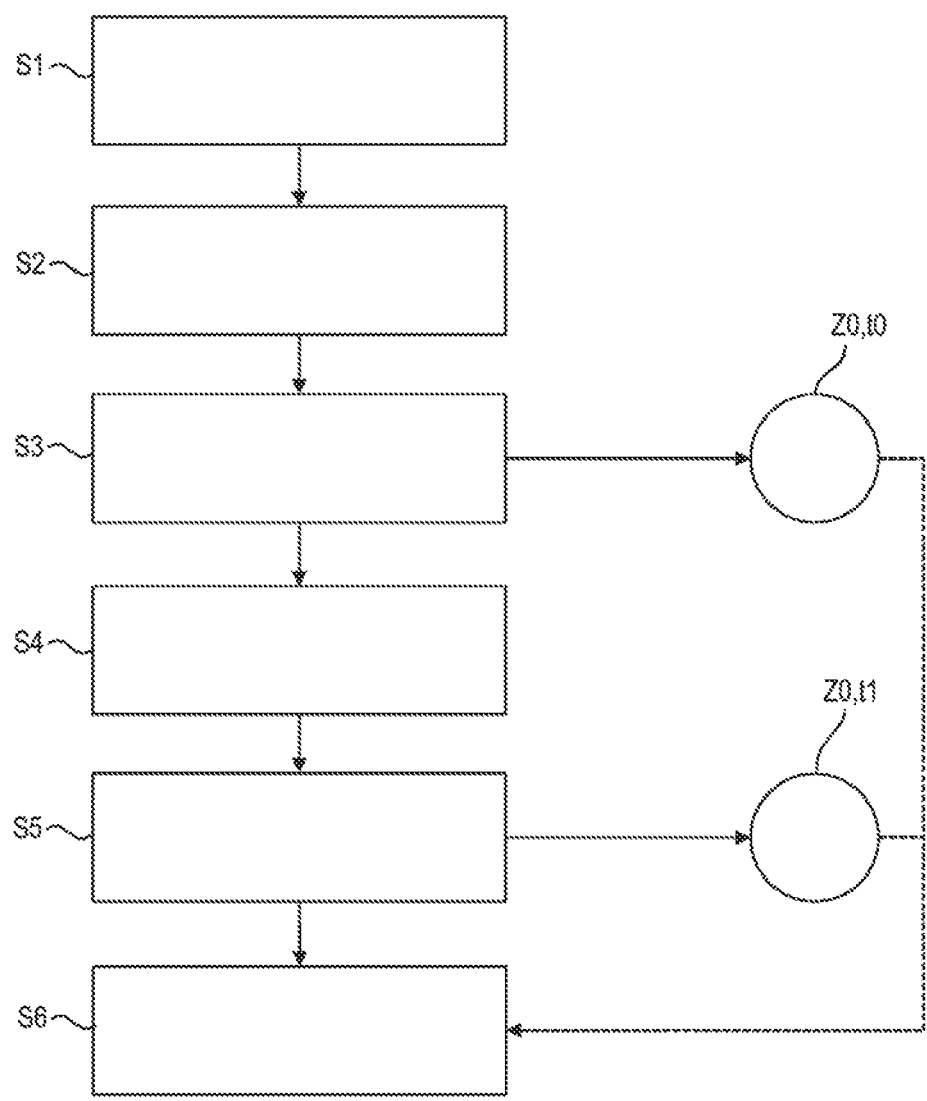
FIG. 4 shows an exemplary embodiment of the method when emptying the vaporizer, by way of a flow chart.

As illustrated in FIG. 4, the vaporizer 1 may also be operated such that at least the delivery output Le of the drainage pump 22 may be determined or "calibrated" when the vaporizer 1 or its receiving chamber is emptied. In this context, the vaporizer 1 is operated in an "abnormal" operation or using an "abnormal" program that does not serve for the vapor processing of food. This abnormal operation may be carried out for example on first start-up of the domestic steam cooking appliance H, after a power recovery, following certain maintenance programs, as part of a descaling program and/or in the context of a function test of the drainage pump 22.

For this purpose, controlled by a control system 24, in a step S1 the vaporizer 1 is filled by means of the filling pump 21 to slightly above its predetermined filling level L1 such that the contact pins 16, which serve as level detectors, are short circuited. This is identified by a control system 24. The control system 24 then stops the filling pumps 21 and, in a step S2, starts the drainage pump 22. This empties the vaporizer 1 or its receiving chamber R.

In a subsequent step S3, once at least one of the contact pins 16 is no longer covered with water and consequently the level falls below the upper filling level, at a starting time t0 a time measurement Z0 is started (for example by the control system 24) by means of a time measuring arrangement, or timer, that is integrated in the control system 24.

In a step S4, directly once the time measurement Z0 begins or with a predetermined delay, the surface heating system 9 is switched on. As the time progresses, the vaporizer 1 empties. Then the surface heating system 9 overheats with only a slight time delay, and this fact may be established for example by the control system 24. The control system 24 then stops the time measurement, in a step S5, at an end time t1. The control system 24 moreover disconnects or switches off the surface heating system 9 and stops the drainage pump 22.

In a further step S6, the control system 24, which also serves as a calculating arrangement, calculates the delivery output Le of the drainage pump 22, for example using equation (1) or equation (2).

Figure 5:
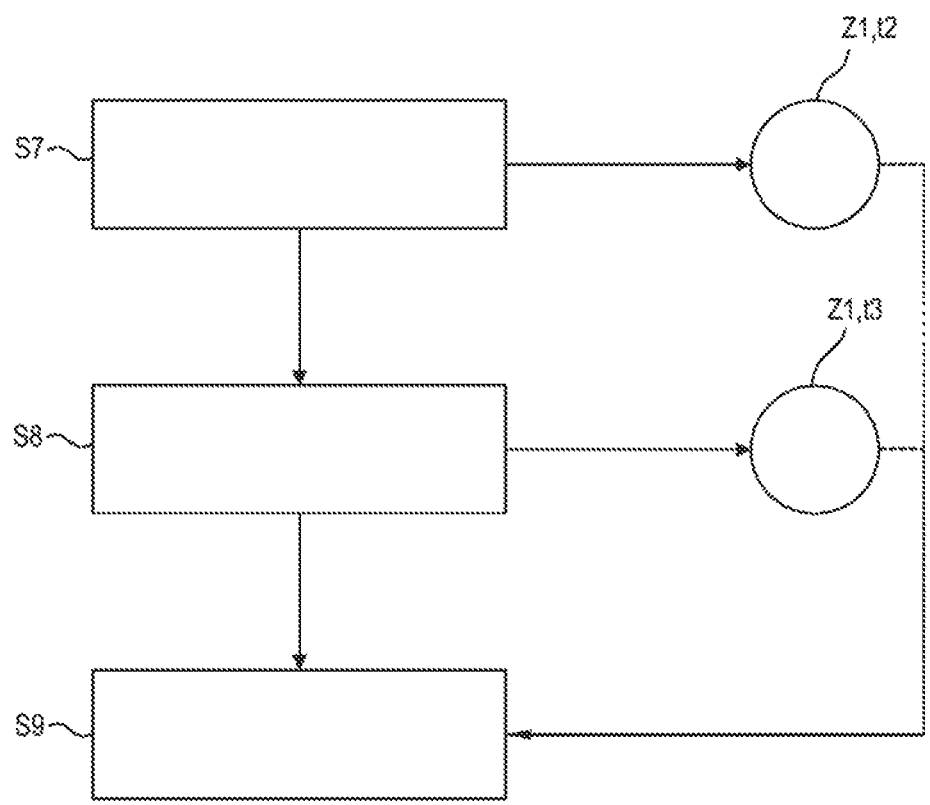
FIG. 5 shows an exemplary embodiment of the method when filling the vaporizer, by way of a flow chart.

FIG. 5 shows an exemplary embodiment of the method, including a filling that follows the emptying according to steps S1 to S6.

Here, the previously emptied vaporizer 1 is filled again, in a step S7, by means of the filling pump 21. As filling of the vaporizer 1 begins, a time measurement Z1 is started at a starting time t2, for example by means of the control system 24. Once the water reaches the contact pins 16, the upper filling level L1 is reached.

At this end time t3, the control system 24 then stops the time measurement Z1 and, in a step S8, establishes a duration Δtb=t3−t2 required for filling the receiving chamber R up to the filling level L1.

In a subsequent step S9, the control system 24 calculates a delivery output Fb during filling by means of dividing the known volume V of water at the upper filling level L1 by the duration Δtb in a manner similar to equation (1) or similar to equation (2), for example.

The present invention is of course not restricted to the exemplary embodiment that is shown.

In general, the terms "a", "an" and so on may be understood as singular or plural, in particular in the context of "at least one" or "one or more" and so on, provided this is not explicitly ruled out, for example by the expression "precisely one" and so on.

It is also possible for a numerical specification to comprise precisely the specified number and also a conventional tolerance range, provided this is not explicitly ruled out.

The invention claimed is:

1. A method for operating a vaporizer of a domestic appliance, said method comprising the steps of:
   (i) filling the vaporizer at least to a predetermined filling level;
   (ii) emptying the vaporizer using an emptying arrangement which includes a pump;
   (iii) starting a time measurement when a filling level falls below the predetermined filling level;
   (iv) switching on a heating system of the vaporizer when the filling level falls below the predetermined filling level;
   (v) stopping the time measurement when the heating system has overheated; and
   (vi) calculating a delivery output of the pump during emptying of the vaporizer, from a duration for emptying that is determined by the time measurement, thereby to avoid the pump from running dry.

2. The method of claim 1, wherein the step (i) comprises filling the vaporizer beyond the predetermined filling level.

3. The method of claim 1, wherein the step (iv) comprises switching on the heating system directly when the level falls below the predetermined filling level.

4. The method of claim 1, wherein the step (iv) comprises switching on the heating system with a defined delay when the level has fallen below the predetermined filling level.

5. The method of claim 1, further comprising switching off the heating system when the heating system has overheated in step (v).

6. The method of claim 1, wherein the step (vi) comprises dividing a liquid volume of the vaporizer by the emptying duration.

7. The method of claim 1, further comprising, after the step (vi), the steps of:
   (a) filling the vaporizer at least to the predetermined filling level;
   (b) establishing a duration for filling to the predetermined filling level; and
   (c) calculating a delivery output during filling by dividing a liquid volume of the vaporizer by the duration for filling.

8. The method of claim 7, wherein in normal operation filling of the vaporizer is stopped, when a safety threshold value that is determined based on the delivery output during filling is reached or exceeded.

9. The method of claim 1, further comprising executing the steps (i) to (vi) only in an abnormal operation where there is an absence of a vapor processing of food.

10. A vapor processing appliance, comprising:
    a vaporizer including a level detector configured to detect a predetermined filling level, a heating system, and an overheating detector configured to determine when the heating system has overheated;
    a filling arrangement for filling the vaporizer at least to a predetermined filling level;
    an emptying arrangement which includes a pump for emptying the vaporizer;
    a time measuring arrangement responsive, when a filling level falls below the predetermined filling level, thereby causing switching on of the heating system, said time measuring arrangement being configured to stop a time measurement when the heating system has overheated; and
    a calculating arrangement configured to at least calculate a delivery output of the pump during emptying of the vaporizer, from a duration for emptying that is determined by the time measurement arrangement, thereby to avoid the pump from running dry.

11. The vapor processing appliance of claim 10, wherein the vapor processing appliance comprises a steam cooking appliance.

12. The vapor processing appliance of claim 10, wherein the vaporizer has a receiving chamber for liquid, said heating system being configured as a surface heating system which is arranged on a base of the receiving chamber, said receiving chamber capable of being filled via the filling arrangement and emptied via the emptying arrangement.

13. The vapor processing appliance of claim 10, wherein the heating system serves as an overheating detector.

14. The vapor processing appliance of claim 10, wherein the filling arrangement includes a pump or is a pump.

* * * * *